US005318430A

United States Patent [19]

Ramm

[11] Patent Number: 5,318,430

[45] Date of Patent: Jun. 7, 1994

[54] CALENDER FOR THE PRODUCTION OF PACKING SHEETS AND METHOD OF CONTROLLING THE OPERATION OF APPARATUS FOR PRODUCING PACKING SHEETS

[75] Inventor: Hans F. Ramm, Hemmingen, Fed. Rep. of Germany

[73] Assignee: Paul Troester Maschinenfabrik, Hanover, Fed. Rep. of Germany

[21] Appl. No.: 22,793

[22] Filed: Feb. 23, 1993

Related U.S. Application Data

[63] Continuation of Ser. No. 681,992, Apr. 8, 1991, abandoned.

[30] Foreign Application Priority Data

Apr. 9, 1990 [DE] Fed. Rep. of Germany ....... 4011410

[51] Int. Cl.[5] ............ B29C 35/00

[52] U.S. Cl. ............ 425/141; 264/175; 425/367; 425/372; 492/10

[58] Field of Search ............ 425/28.1, 141, 150, 425/335, 363, 367, 372, DIG. 235; 264/175; 492/9, 10, 11, 66

[56] References Cited

U.S. PATENT DOCUMENTS

| | | | |
|---|---|---|---|
| 3,292,208 | 12/1966 | Wood | 425/367 |
| 3,531,827 | 10/1970 | Dragonette | 425/367 |
| 3,600,747 | 8/1971 | McCarthy | 425/367 |
| 3,655,312 | 4/1972 | Erb et al. | 425/367 |
| 3,893,795 | 7/1975 | Nauta | 425/363 |
| 4,038,012 | 7/1977 | Sander | 425/363 |
| 4,117,054 | 9/1978 | Salo | 425/367 |
| 4,260,578 | 4/1981 | Moody | 425/367 |
| 4,302,478 | 11/1981 | Hamann et al. | 425/367 |
| 4,319,868 | 3/1982 | Riemersma et al. | 425/363 |
| 4,519,757 | 5/1985 | Wittkopf et al. | 425/367 |

*Primary Examiner*—David A. Simmons
*Assistant Examiner*—William J. Matney, Jr.
*Attorney, Agent, or Firm*—Robert E. Burns; Emmanuel J. Lobato

[57] ABSTRACT

A calender for producing packing sheets, in particular packing sheets reinforced with synthetic fiber, has a large diameter heated cylinder, on which a packing sheet is formed and vulcanized, rotatably supported by spaced calender stands and driven by a direct current motor. An unheated cylinder of smaller diameter also driven by a direct current motor, is supported by the calender stands for rotation and for movement toward and away from the heated cylinder and is hydraulically pressed toward the heated cylinder as a pressure roller. The circumferential speed of each of the cylinders is sensed by a pick-up activated by uniformly spaced marks on the circumference of the cylinder and the thickness of the packing sheet on the heated cylinder is sensed by sensing the position of the shaft of the pressure roller. Signals of the pick-ups which sense circumferential speeds of the cylinders and the sensor which senses position of the shaft of the pressure roller shaft are fed to inputs of a processor of which two outputs are connected respectively to speed controls of the motors which drive the cylinders. The processor is programmed to synchronize the circumferential speed of the two cylinders, or alternatively, to provide a small speed difference to apply friction to the packing sheet.

15 Claims, 2 Drawing Sheets

CALENDER FOR THE PRODUCTION OF PACKING SHEETS AND METHOD OF CONTROLLING THE OPERATION OF APPARATUS FOR PRODUCING PACKING SHEETS

This is a continuation of application Ser. No. 07/681,992, filed Apr. 8, 1991, now abandoned.

FIELD OF INVENTION

The invention relates to a calender for the production of packing sheets which comprises a motor driven heated cylinder of large diameter rotatable in stationary bearings and an unheated cylinder of smaller diameter rotatable in slidable bearings and pressed toward the heated cylinder by a pressing force.

BACKGROUND OF THE INVENTION

For the production of fiber reinforced flat gaskets, which are required in many applications in the technical field, there is used a so called packing sheet calender which has a heated cylinder on which the sheets are rolled and vulcanized, and a cooled cylinder which serves as a pressing roller for the composition and is usually pressed hydraulically. The gaskets are thereby produced from rubber made workable by a solvent and fiber which gives the finished product its strength. Traditionally asbestos fiber was used as the reinforcing fiber, as the gasket production and use excluded other fibers on thermal grounds. However asbestos has become undesirable to an increasing extent on the ground of danger to health and in recent times is replaced, in-so-far as possible, by new high strength and thermal resistant synthetic fiber.

The production of satisfactory packing sheets depends on the precision of the roundness of the cylinders, the qualities of the cylinder surfaces, the temperature and its exactness, the uniformity of the roller pressure and, above all, the high precision of the circumferential velocity of the two cylinders (synchronism). With the traditional material of the packing sheets, thus with asbestos fiber reinforcement, it was sufficient, with respect to the synchronism of the cylinders, to use precision coupling wheels for the two cylinders. However there is a problem that with the coupling wheels, a practical exact synchronism can be obtained only with a definite sheet thickness. At the beginning of the sheet construction or upon exceeding these definite values, a deviation from the optimum occurs. The diameter of the heated cylinder changes with changes in temperature and also changes, in the life of the cylinder, when the cylinder must be reground on account of wear. For these reasons, the synchronism of the rollers use of coupling wheels to achieve is, in principle, insufficient i.e. limited.

Through use in the calender construction of known individual cylinder drives it has been sought to remedy this deficiency by providing precise mechanical control of the drive of the pressing cylinder as well as also using synchronous motors. However there remained the deficiency that it was practically impossible, in both cases, to attain the desired synchronism of the cylinders. A particular disadvantage lay therein that the optimal synchronism depends on the thickness of the sheet being formed, which in each process requires constant readjustment.

With the introduction of new fibers, which are not asbestos, these problems become even more serious. When, for example, the optimal adjustment of the synchronism is not precisely attained, there is a danger that the not yet vulcanized sheet being formed may be pulled apart and thereby destroyed.

SUMMARY OF THE INVENTION

The present invention avoids these disadvantages of the state of the art and provides the possibility of incisively improving the technique of producing packing sheets and thereby provides the possibility of working with those fibers which are replacing asbestos fibers. It is the object of the invention that, through continual measurement of the thickness of the sheet being formed there is provided the possibility of readjusting the lineal circumferential speed of the rollers as well for an exact synchronism of the roller circumferences as also creating a precise controllable friction.

The invention consists therein that both driving motors of the two cylinders are controlled through a program controlled micro-processor of which one input is connected with a sensor of the displacement of the axle or axle bearing of the pressure cylinder, a second input is connected with a sensor for detecting the passage of marks on the heated cylinder or its drive shaft, a third input is connected with a sensor for detecting the passage of marks on the pressure cylinder or its drive shaft and of which the two outputs are connected respectively with means for controlling the speed of rotation of the two motors for driving the heated cylinder and the unheated cylinder respectively.

Through an exact measurement of the circumferential speed of the cylinders, through measurement of the time intervals of the appearance of marks arranged on the circumferences of the cylinders and through an exact measurement of the sheet thickness which is given by the sensor for the displacement of the axle or axle bearing of the pressure cylinder, it is possible to control the two motors for driving the two cylinders respectively so as to provide exact and absolutely equal peripheral surface speed in spite of increase of the effective diameter of the heated cylinder on account of the increased thickness of the sheet of plastic material on its circumference. However, it is also possible in the same period of operation, or for a particular time in the period of operation, or for a particular sheet thickness to provide friction through precise retarding of the drive speed, or an increase in the drive speed of the pressure cylinder with respect to synchronous speed. It is hereby possible to use fibers which cannot be used with conventional calenders and it also makes it possible to produce new qualities of packing sheets which are achieved through the application of friction during particular phases of formation of the packing sheets.

It is advantageous when a digital switching network is provided in the micro-processor. This simplifies the programming of the micro-processor.

It is expedient to provide a slowing down control device for the pressure cylinder, as its drive is easier to control by reason of its lesser weight relative to the heated cylinder.

For the required highly exact measurement of the lineal circumferential speed of the calender it is advantageous when the sensors activated by marks on the cylinders are incremental.

Moreover it is advantageous when there is provided a selector switch for switching between synchronism of the cylinders and an adjustable deviation of the lineal circumferential speed of the pressure cylinder with respect to that of the heated cylinder.

Moreover it is advantageous when there is provided at least one feeler for making contact with the outer surface of the plate formed on the heated cylinder and connected with a further input of the processor.

BRIEF DESCRIPTION OF THE DRAWINGS

The essence of the invention will be more fully understood from the following description of a preferred embodiment shown schematically in the accompanying drawings in which.

DESCRIPTION OF PREFERRED EMBODIMENT

Figure 1:
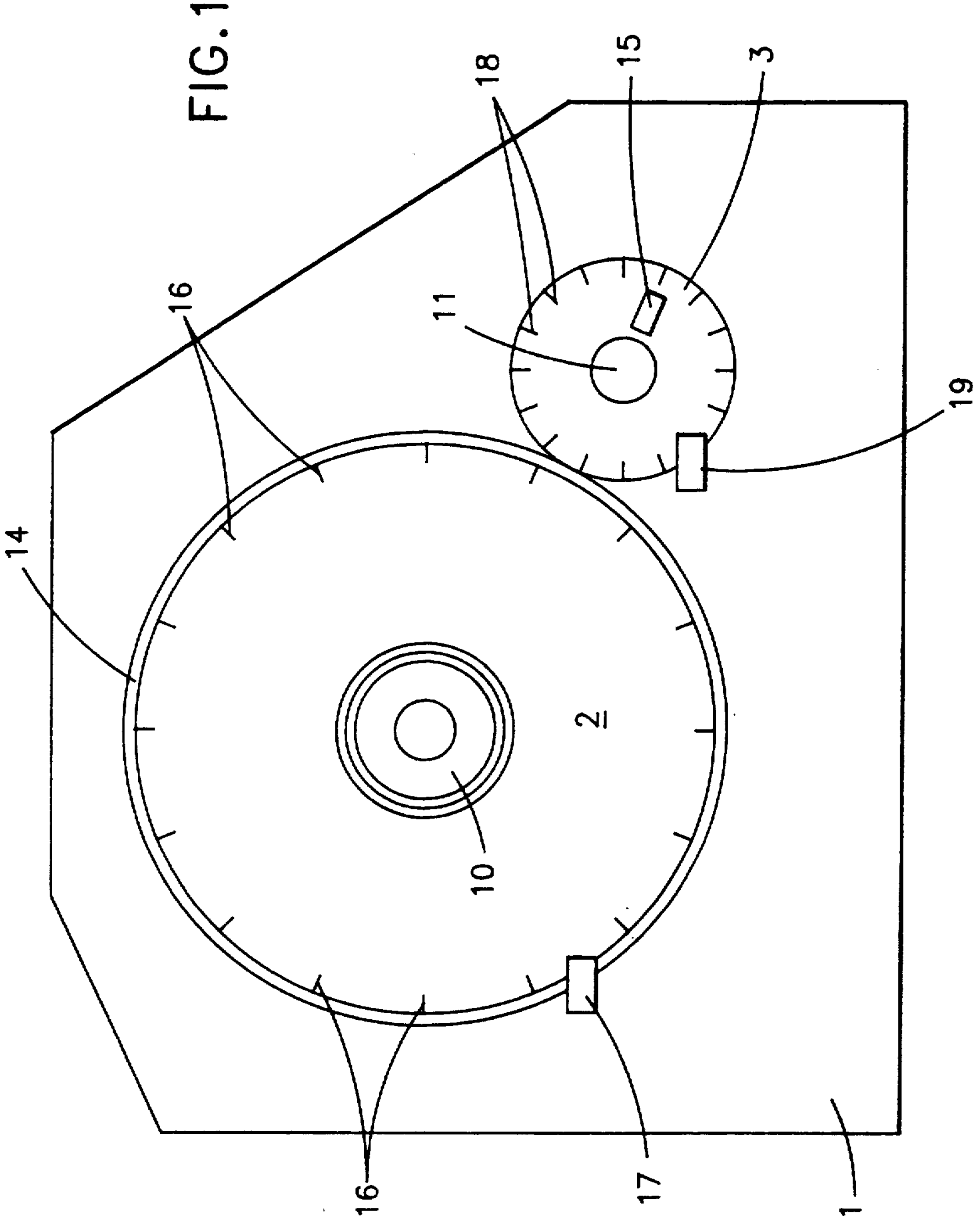
FIG. 1 is a schematic side elevation of a calender in accordance with the invention.
Figure 2:
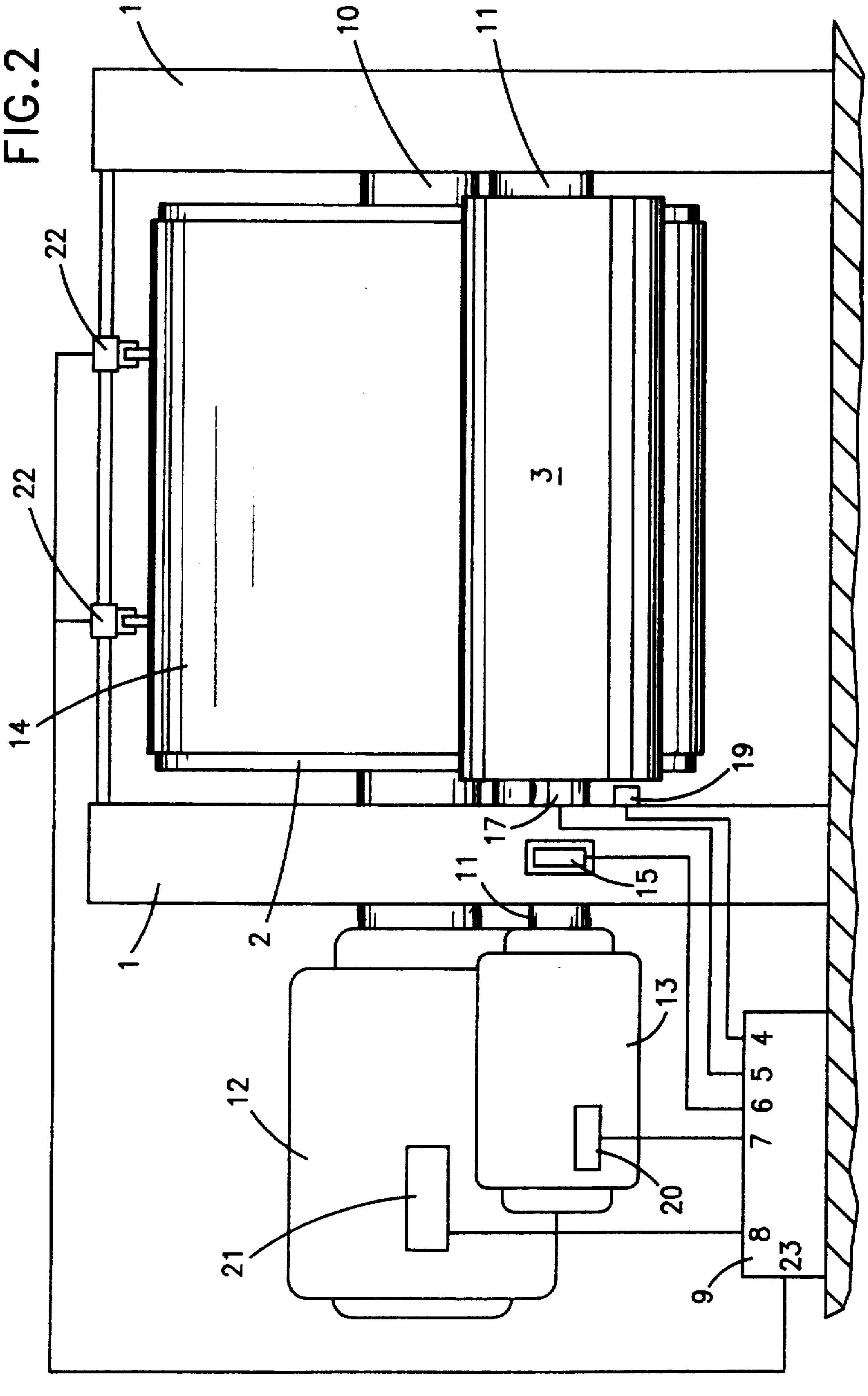
FIG. 2 is a schematic front elevation of the calender.

The shaft 10 of the heated cylinder 2 and the shaft 11 of the pressure cylinder 3 are rotatably supported by bearings in calender stands 1. A direct current motor 12 drives the shaft 10 of the heated cylinder 2 and a direct current motor 13 drives the shaft 11 of the pressure cylinder 3. The bearings of the shaft 10 of the heated cylinder 2 are stationary in the calender stands 1 while the bearings of the shaft 11 of the pressure cylinder 3 are slidable in the calender stands I and are pressed by a hydraulically produced force toward the bearings of the shaft 10 of the heated cylinder. The position of the shaft 11 of the pressure cylinder 3 depends of the thickness of the packing sheet 14 formed on the heated cylinder 2. The position of the shaft 11 of the pressure cylinder 3 is sensed by a sensor or pickup 15.

An end of the heated cylinder 2 is provided at its circumference with uniformly spaced marks 16. Adjacent this end wall, there is provided an optical sensor or pickup 17 which produces an electrical impulse upon passage of each of the marks 16 on the end wall of the heated cylinder and which is connected with an input 5 of a processor 9. Likewise marks 18 are provided at the circumference of an end wall of the pressure cylinder 3 and passage of the these marks 15 is sensed by a sensor or pickup 19 which is connected with an input 4 of the processor 9.

A third input 6 of the processor 9 is connected with the sensor 15 which senses the position of the shaft 11 of the pressure cylinder 3 and thus the thickness of the packing sheet.

The processor 9 has two outputs 7 and 8 of which the output 7 is connected with a control device 20 for controlling the speed of the motor 13 which drives the pressure cylinder 3 and the other output 8 is connected with a control device 21 for controlling the speed of the motor 12 which drives the heated cylinder 4.

There are further provided two sensors or feelers 22 which engage the outer surface of the sheet 14 formed on the heated cylinder 2 to measure the thickness of the sheet and which are connected a further input 23 of the processor 9.

In operation of the apparatus, the sensor 15 senses the position of the shaft 11 of the pressure roller 3 and thus the thickness of the sheet formed on the heated cylinder 2. The thickness of the sheet formed on the heated cylinder 2 is further checked by the feelers 22. The sensor 17 provides a signal indicative of the lineal circumferential speed of the heated cylinder 2 while the sensor 19 generates a signal indicative of the lineal circumferential speed of the pressure cylinder 3.

The signals generated by the respective sensors 15, 17 and 19 and the feelers 22 are fed to respective inputs of the processor 9 which is programmed to control, through its outputs 7 and 8, the direct current motors 13 and 12 driving the pressure cylinder 3 and the heated cylinder 2 to provide equal peripheral surface speeds so that the two cylinders rotate in synchronism of one another. Alternatively, the processor 9 is controllable selectively to apply precisely determined friction to the packing sheet being formed by increasing or decreasing the speed of the pressure cylinder relative to that of the heated cylinder by a precisely controlled amount.

What I claim is:

1. Apparatus for producing packing sheets, said apparatus comprising spaced calendar stands,
   - a heated cylinder of large diameter rotably supported by said calender stands,
   - a motor for driving said heated cylinder in rotation, said heated cylinder having a cylindrical circumferential surface on which a packing sheet is progressively formed by application of a rubber composition containing fibers to said surface during successive revolutions of said heated cylinder,
   - an unheated cylinder having a smaller diameter than said heated cylinder and having a cylindrical circumferential surface,
   - means for supporting said unheated cylinder for rotation and for movement toward and away from said heated cylinder and means for exerting a force in a direction to move said unheated cylinder toward said heated cylinder to press said circumferential surface of said unheated cylinder into engagement with said packing sheet as it is progressively formed on said circumferential surface of said heated cylinder,
   - a controllable variable speed motor for driving said unheated cylinder in rotation in a direction opposite to the direction of rotation of said heated cylinder,
   - means for controlling the speed of rotation of said motor for driving said unheated cylinder,
   - first sensing means, positioned adjacent the circumference of said heated cylinder, for sensing the lineal circumferential speed of said heated cylinder and producing a signal representing said speed,
   - second sensing means, positioned adjacent the circumference of said unheated cylinder, for sensing the lineal circumferential speed of said unheated cylinder and producing a signal representing said speed,
   - third sensing means for sensing the increasing thickness of a packing sheet as it is progressively formed on said circumferential surface of said heated cylinder and producing a signal representing said thickness, and
   - a micro-processor having a first input connected with said first sensing means for receiving said signal representing the lineal circumferential speed of said heated cylinder, a second input connected with said second sensing means for receiving said signal representing the lineal circumferential speed of said unheated cylinder, a third input connected with said third sensing means for receiving said signal representing the increasing thickness of said packing sheet as it is being formed on said circumferential surface of said heated cylinder and an output connected with said means for controlling the speed of said motor for driving said unheated cylinder to drive said unheated cylinder at a lineal circumferential speed equal to the lineal peripheral surface speed of said packing sheet on said circumferential surface of said heated cylinder and thereby preventing said unheated cylinder from exerting a shearing action on said packing sheet on said circumferential surface of said heated cylinder.

2. Apparatus according to claim 1, in which said motor for driving said heated cylinder is also a controllable variable speed motor and in which means is provided for controlling the speed of said motor for driving said heated cylinder, and said micro-processor is provided with a second output connected with said means for controlling the speed of said motor for driving said heated cylinder.

3. Apparatus according to claim 1, in which said means for sensing the lineal circumferential speed of said heated cylinder comprises uniformly circumferentially spaced marks on the circumference of said heated cylinder and a sensor which is positioned adjacent the circumference of said heated cylinder and which produces a pulse upon the passage of each of said marks.

4. Apparatus according to claim 1, in which said means for sensing the lineal circumferential speed of said unheated cylinder comprises uniformly circumferentially spaced marks on the circumference of said unheated cylinder and a sensor which is positioned adjacent the circumference of said unheated cylinder and which produces a pulse upon the passage of each of said marks.

5. Apparatus according to claim 1, in which said micro-processor comprises a digital switching network.

6. Apparatus according to claim 1, in which said third sensing means for sensing the thickness of a packing sheet formed on said heated cylinder comprises a sensor for sensing the position of the axis of rotation of said unheated cylinder relative to the axis of rotation of said heated cylinder.

7. Apparatus according to claim 1, in which said third sensing means for sensing the thickness of a packing sheet formed on said circumferential surface of said heated cylinder comprises a feeler roller engageable with the surface of said packing sheet.

8. Apparatus for producing packing sheets, said apparatus comprising spaced calender stands, a heated cylinder of large diameter rotatably supported by said calender stands, a motor for driving said heated cylinder in rotation, said heated cylinder having a cylindrical circumferential surface on which a packing sheet is progressively formed by application of a rubber composition containing fibers to said surface during successive revolutions of said heated cylinder, an unheated cylinder having a smaller diameter than said heated cylinder and having a cylindrical circumferential surface, means for supporting said unheated cylinder for rotation about an axis parallel to the axis of rotation of said heated cylinder and for movement toward and away from said heated cylinder and means for exerting a force in a direction to move said unheated cylinder toward said heated cylinder to press said circumferential surface of said unheated cylinder into engagement with said packing sheet as it is progressively formed on said circumferential surface of said heated cylinder, a controllable variable speed motor for driving said unheated cylinder in rotation in a direction opposite to the direction of rotation of said heated cylinder, means for controlling the speed of rotation of said motor for driving said unheated cylinder, first sensing means, positioned adjacent the circumference of said heated cylinder, for sensing the lineal circumferential speed of said heated cylinder and producing a signal representing said speed, second sensing means, positioned adjacent the circumference of said unheated cylinder, for sensing the lineal circumferential speed of said unheated cylinder and producing a signal representing said speed, third sensing means for sensing the increasing thickness of a packing sheet as it is progressively formed on said circumferential surface of said heated cylinder and producing a signal representing said thickness, a micro-processor having a first input connected with said first sensing means for receiving said signal representing lineal circumferential speed of said heated cylinder, a second input connected with said second sensing means for receiving said signal representing the lineal circumferential speed of said unheated cylinder, a third output connected with said third sensing means for receiving said signal representing the increasing thickness of said packing sheet on said circumferential surface of said heated cylinder and an output connected with said means for controlling the speed of rotation of said motor for driving said unheated cylinder, and selector switch means for switching said micro-processor between a mode in which said micro-processor controls the speed of rotation of said motor for driving said unheated cylinder to drive said unheated cylinder at a lineal circumferential speed equal to the peripheral surface speed of said packing sheet on said heated cylinder and a mode in which said micro-processor controls the speed of rotation of said motor for driving said unheated cylinder at a lineal circumferential speed which deviates, to a controlled degree, from the lineal peripheral surface speed of said packing sheet on said heated cylinder.

9. Apparatus according to claim 8, in which said first sensing means for sensing the lineal circumferential speed of said heated cylinder comprises uniformally circumferentially spaced marks on the circumference of said heated cylinder and a sensor which is positioned adjacent the circumference of said heated cylinder and which produces a pulse upon the passage of each of said marks.

10. Apparatus according to claim 8, in which said second sensing means for sensing the lineal circumferential speed of said unheated cylinder comprises uniformly spaced marks on the circumference of said unheated cylinder and a sensor which is positioned adjacent the circumference of said unheated cylinder and which produces a pulse upon the passage of each of the said marks.

11. Apparatus according to claim 8, in which said third sensing means for sensing the thickness of a packing sheet on said heated cylinder comprises means for sensing the position of the axis of rotation of said unheated cylinder relative to the axis of rotation of said heated cylinder.

12. Apparatus according to claim 8, in which said third sensing means for sensing the thickness of a packing sheet on rotation of said heated cylinder comprises at least one feeler roller engageable with the surface of said packing sheet.

13. A method of controlling the operation of apparatus for producing packing sheets, said apparatus comprising spaced calender stands, a heated cylinder of large diameter which has a smooth cylindrical circumferential surface and which is supported by said calender stands for rotation about its axis, a motor for driving said heated cylinder in rotation, an unheated cylinder having a smaller diameter than said heated cylinder and having a smooth cylindrical circumferential surface, means for supporting said unheated cylinder for rotation about an axis parallel to the axis of rotation of said heated cylinder and for movement toward and away from said heated cylinder, and a controllable variable speed motor for driving said unheated cylinder in rotation, said method comprising the steps of:

driving said heated cylinder in rotation at a selected speed, applying rubber composition containing fibers uniformly to said circumferential surface of said heated cylinder as it rotates to form a packing sheet progressively on said circumferential surface of said heated cylinder during a plurality of revolutions of said heated cylinder, exerting a force on said unheated cylinder in a direction to move said unheated cylinder toward said heated cylinder and thereby press the circumferential surface of said unheated cylinder with engagement with an outer surface of said packing sheet being formed on said circumferential surface of said heated cylinder, sensing the increasing thickness of said packing sheet as it is being progressively formed on said circumferential surface of said heated cylinder, and controlling the speed of rotation of said unheated cylinder as a function of said sensed lineal circumferential surface speed of said heated cylinder, said sensed lineal circumferential surface speed of said unheated cylinder and said sensed thickness of said packing sheet being progressively formed on said circumferential surface of said heated cylinder to rotate said unheated cylinder at a lineal circumferential surface speed equal to the lineal peripheral outer surface speed of said packing sheet on said circumferential surface of said heated cylinder and thereby prevent shearing action on said packing sheet.

14. A method of controlling the operation of apparatus for producing packing sheets, said apparatus comprising spaced calender stands, a heated cylinder of large diameter which has a smooth cylindrical circumferential surface and which is supported by said calender stands for rotation about its axis, a motor for driving said heated cylinder in rotation, an unheated cylinder having a smaller diameter than said heated cylinder and having a smooth cylindrical circumferential surface, means for supporting said unheated cylinder for rotation about an axis parallel to the axis of rotation of said heated cylinder and for movement toward and away from said heated cylinder, and a controllable variable speed motor for driving said unheated cylinder in rotation, said method comprising the steps of:

driving said heated cylinder in rotation at a selected speed, applying rubber composition containing fibers uniformly to said circumferential surface of said heated cylinder as it rotates to form a packing sheet progressively on said circumferential surface of said heated cylinder during a plurality of revolutions of said heated cylinder, exerting a force on said unheated cylinder in a direction to move said unheated cylinder toward said heated cylinder and thereby press the circumferential surface of said unheated cylinder into engagement with an outer surface of said packing sheet being formed on said circumferential surface of said heated cylinder, sensing the increasing thickness of said packing sheet as it is being progressively formed on said circumferential surface of said heated cylinder, and controlling the speed of rotation of said cylinders as a function of said sensed lineal circumferential surface speed of said heated cylinder, said sensed lineal circumferential surface speed of said unheated cylinder and said sensed thickness of said packing sheet being progressively formed on said circumferential surface of said heated cylinder for a selected period of time to rotate said unheated cylinder at a lineal circumferential surface speed equal to the lineal peripheral outer surface speed of said packing sheet on said circumferential surface of said heated cylinder, and controlling the speed of rotation of said cylinders as a function of said sensed lineal circumferential surface speed of said heated cylinder, said sensed lineal circumferential surface speed of said unheated cylinder and said sensed thickness of said packing sheet being progressively formed on said circumferential surface of said heated cylinder for another selected period of time to rotate said unheated cylinder at a lineal circumferential surface speed which deviates in a controlled direction and amount from the lineal peripheral outer surface speed of said packing sheet on said circumferential surface of said heated cylinder to align fibers in said rubber composition.

15. A method of controlling the operation of apparatus for producing a packing sheet according to claim 14, in which the speed of rotation of said cylinders is controlled for a first period of time from the beginning of forming a packing sheet to rotate said unheated cylinder at a lineal peripheral speed equal to the lineal peripheral outer surface speed of said packing sheet being formed on said circumferential surface of said heated cylinder to prevent shearing action on said packing sheet and, after said packing sheet has attained a selected thickness, the speed of rotation of said cylinders is controlled to rotate said unheated cylinder at a lineal circumferential surface speed which deviates in a selected direction and amount from the lineal peripheral outer surface speed of said packing sheet and thereby align fibers contained in said rubber composition.

* * * * *